United States Patent
Martos et al.

(10) Patent No.: US 9,454,439 B2
(45) Date of Patent: Sep. 27, 2016

(54) DISASTER RECOVERY VALIDATION

(71) Applicant: Unitrends, Inc., Columbia, SC (US)

(72) Inventors: Alberto Gonzalez Martos, Madrid (ES); Vernon Keith Boland, Lexington, SC (US); Elizabeth Campbell, Lexington, SC (US)

(73) Assignee: Unitrends, Inc., Columbia, SC (US)

( * ) Notice: Subject to any disclaimer, the term of this patent is extended or adjusted under 35 U.S.C. 154(b) by 168 days.

(21) Appl. No.: 14/497,846

(22) Filed: Sep. 26, 2014

(65) Prior Publication Data

US 2015/0347242 A1 Dec. 3, 2015

Related U.S. Application Data

(60) Provisional application No. 62/003,745, filed on May 28, 2014.

(51) Int. Cl.
| | | |
|---|---|---|
| *G06F 11/00* | (2006.01) | |
| *G06F 11/14* | (2006.01) | |
| *G06F 11/20* | (2006.01) | |

(52) U.S. Cl.
CPC ....... *G06F 11/1458* (2013.01); *G06F 11/1469* (2013.01); *G06F 11/203* (2013.01); *G06F 11/2038* (2013.01); *G06F 11/2048* (2013.01); *G06F 2201/815* (2013.01)

(58) Field of Classification Search
CPC ........... G06F 11/1458; G06F 11/1469; G06F 11/1484; G06F 11/203; G06F 2201/815
See application file for complete search history.

(56) References Cited

U.S. PATENT DOCUMENTS

| | | | |
|---|---|---|---|
| 7,246,254 B2* | 7/2007 | Alur | G06F 11/1458 700/173 |
| 7,487,383 B2 | 2/2009 | Bensinger | |
| 8,055,630 B2* | 11/2011 | Dawson | G06Q 10/06 707/674 |
| 8,156,301 B1 | 4/2012 | Khandelwal et al. | |
| 8,181,174 B2 | 5/2012 | Liu | |
| 8,402,309 B2 | 3/2013 | Timashev et al. | |
| 8,423,821 B1 | 4/2013 | Keith, Jr. | |
| 9,235,474 B1 | 1/2016 | Petri et al. | |
| 2005/0108593 A1 | 5/2005 | Purushothaman et al. | |
| 2006/0074993 A1* | 4/2006 | Pulamarasetti | G06F 11/1458 |
| 2007/0260831 A1 | 11/2007 | Michael et al. | |
| 2007/0300220 A1 | 12/2007 | Seliger et al. | |
| 2008/0294933 A1 | 11/2008 | Nishii et al. | |

(Continued)

OTHER PUBLICATIONS

O. H. Alhazmi and Y. K. Malaiya; "Assessing Disaster Recovery Alternatives: On-site, Colocation or Cloud;" in 23rd IEEE International Symposium on Software Reliability Engineering Workshops; Dallas, TX, USA; 2012; pp. 19-20.*

(Continued)

*Primary Examiner* — Joseph Kudirka
(74) *Attorney, Agent, or Firm* — Foley & Lardner LLP; John D. Lanza (57) ABSTRACT

A method and system for the backup and recovery of a converged infrastructure computer system are provided with the ability to determine if the backup meets requirements of a disaster recovery plan. The method and system provide backup and recovery of the data and applications including backup and recovery of the configuration and mapping information of the converged infrastructure computer system. The backups are periodically tested to determine if they meet predetermined metrics that are specified in the disaster recovery plan.

19 Claims, 4 Drawing Sheets

(56) References Cited

U.S. PATENT DOCUMENTS

| | | |
|---|---|---|
| 2009/0125751 A1* | 5/2009 | Dawson .............. G06F 11/1458 714/2 |
| 2009/0222496 A1 | 9/2009 | Liu et al. |
| 2010/0077165 A1 | 3/2010 | Lu et al. |
| 2012/0066446 A1 | 3/2012 | Sabjan et al. |
| 2012/0124355 A1 | 5/2012 | Patro et al. |
| 2012/0233282 A1 | 9/2012 | Voccio et al. |
| 2012/0246639 A1 | 9/2012 | Kashyap et al. |
| 2013/0007726 A1 | 1/2013 | Poddar et al. |
| 2013/0304901 A1* | 11/2013 | Malnati ............... G06F 11/3055 709/224 |
| 2015/0058839 A1 | 2/2015 | Madanapalli et al. |

OTHER PUBLICATIONS

O. H. Alhazmi and Y. K. Malaiya; "Evaluating Disaster Recovery Plans Using the Cloud;" Proc. Reliability and Maintainability Symposium (RAMS); 2013.*

Notice of Allowance on 14/924,459 dated May 24, 2016.

Office Action on U.S. Appl. No. 14/317,722 dated Mar. 11, 2016.

* cited by examiner

DISASTER RECOVERY VALIDATION

FIELD OF THE INVENTION

The present invention relates generally to disaster recovery validation for computer platforms and more specifically to determining if disaster recovery backups meet required metrics for recovering failed computer platforms.

BACKGROUND

It is common to implement some level of disaster recovery for a computer or computer system. A disaster recovery plan includes one or more techniques for backing up part or all of the data, software, and information required to operate a computer or a computer system. Typically, the more critical the application executed by the computer, the higher the level of disaster recovery implemented by the computer.

Computer backup systems may suitably provide functionality to backup and restore individual servers, both at the physical and virtual level to provide the ability to recover the server in the event of a disaster that renders the server unusable. These backups are often referred to as bare-metal backups because a new server can be restored from a blank or "bare metal" state back to the state of the original server including its operating system and applications.

When one or more computer servers are needed to support software functions, the computer servers may be implemented using a converged infrastructure computer solution that is provided by a number of computer hardware vendors. A converged infrastructure computer solution includes an integrated chassis with one or more computer servers, one or more network switches, and disk storage. In addition to providing the physical components in the same chassis, the solution also provides an integrated management component that manages the physical and logical configurations of the components in the chassis. Examples of such converged infrastructure platforms include Cisco's Unified Computing System (UCS), Dell's PowerEdge VRTX, and IBM's Pure-Systems.

Having a backup for a system does not necessarily satisfy all the metrics in a disaster recovery plan. Disaster recovery plans may suitably specify metrics such as a recovery time objective (RTO) and a recovery point objective (RPO). Determining if a backup meets all the requirements of the disaster recovery plans is critical to being able to manage disaster recovery for a computer system.

SUMMARY

Among its several aspects, the present invention seeks to overcome or ameliorate at least one of the disadvantages of the prior art, or to provide a useful alternative.

Among its several aspects, the present invention recognizes the need to measure and validate computer or system backup data to determine if the backup meets disaster recovery plan metrics. The disaster recovery plan metrics may suitably include a recovery time objective (RTO) that specifies the maximum amount of time required to recover both data and access to the data after a failure and a recovery point objective (RPO) that specifies the maximum age of the backed up data.

Among its several aspects, the present invention further recognizes the need to periodically measure disaster recovery plan metrics for a backup and to store measured disaster recovery plan metrics as an attribute associated with the backup on a backup appliance that maintains the backup. The metric attributes determine if the backup currently meets requirements of the disaster recovery plan.

In accordance with the teachings of the present invention, a backup and restore appliance is provided for backing up and restoring converged infrastructure computer platforms. The appliance includes a computer or computer server in communication with one or more converged infrastructure computer platforms.

In accordance with an embodiment of the present invention, there is provided a computer implemented method performed by a disaster recovery validation computer in communication with a backup appliance. The method comprising: transmitting a restore command to the backup appliance wherein the restore command includes information that identifies a backup for the computer and virtual machine and causes the backup appliance to restore the backup to the virtual machine where the backup is maintained by the backup appliance; receiving information from the backup appliance used to measure the time required to boot and bring up the backup on a virtual machine; comparing the measured time to boot and bring up the backup on the virtual machine to a predetermined recovery time objective to determine if the measured recovery time meets the recovery time objective; and transmitting the results of the comparison to the backup appliance to be stored as an attribute of the backup wherein the results include information identifying the backup.

In accordance with an embodiment of the present invention, there is provided a computer implemented method performed by a disaster recovery validation system. The method comprising: retrieving information about a digital backup that is stored on a backup appliance wherein the stored digital backup is for a first converged infrastructure computer platform and is maintained by the backup appliance wherein the backup appliance is responsible for backing up and restoring the first converged infrastructure computer platform; transmitting a restore command to the backup appliance wherein the command includes information identifying the stored digital backup and causes the backup appliance to boot a second converged infrastructure computer platform from the identified stored digital backup and to execute the applications stored in the identified stored digital backup; receiving from the backup appliance information used to measure the time required to boot the identified stored digital backup on the second converged infrastructure computer platform; comparing the measured time to boot the identified stored digital backup to a predetermined recovery time objective to determine if the identified stored digital backup meets the predetermined recovery time objective; and transmitting the results of the comparison to the backup appliance to be stored as an attribute of the backup wherein the results include information identifying the backup.

In accordance with another embodiment of the present invention, there is provided a disaster recovery validation system comprising: a backup appliance operable to execute a first application where the first application, when executed by the computer, causes the computer to: maintain a backup for a first converged infrastructure computer platform; receive backup attribute information associated with the backup for the first converged infrastructure computer platform; and associate the received backup attribute information with the first converged infrastructure computer platform; and a computer operable to communicate with the backup appliance and operable to execute a second application where the second application, when executed by the computer, causes the computer to: measure the time required to boot and bring up the backup on a second converged infrastructure computer platform; compare the measured time required to restore the backup to a predetermined recovery time objective to determine if restoring the backup meets the recovery time objective; and transmit the results of the comparison to the backup appliance to be stored as an attribute of the backup wherein the results include information identifying the backup.

In accordance with yet another embodiment of the present invention, there is provided a computer implemented method performed by a disaster recovery validation computer in communication with a backup appliance responsible for backing up a computer. The method comprises: isolating a virtual machine from production networks by assigning the virtual machine to an isolated network; determining the time required to boot and bring up a backup for the computer on the virtual machine where the backup is maintained by the backup appliance; comparing the measured time to boot and bring up the backup to a predetermined recovery time objective to determine if the backup meets the recovery time objective; and transmitting the results of the comparison to the backup appliance to be stored as an attribute of the backup.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
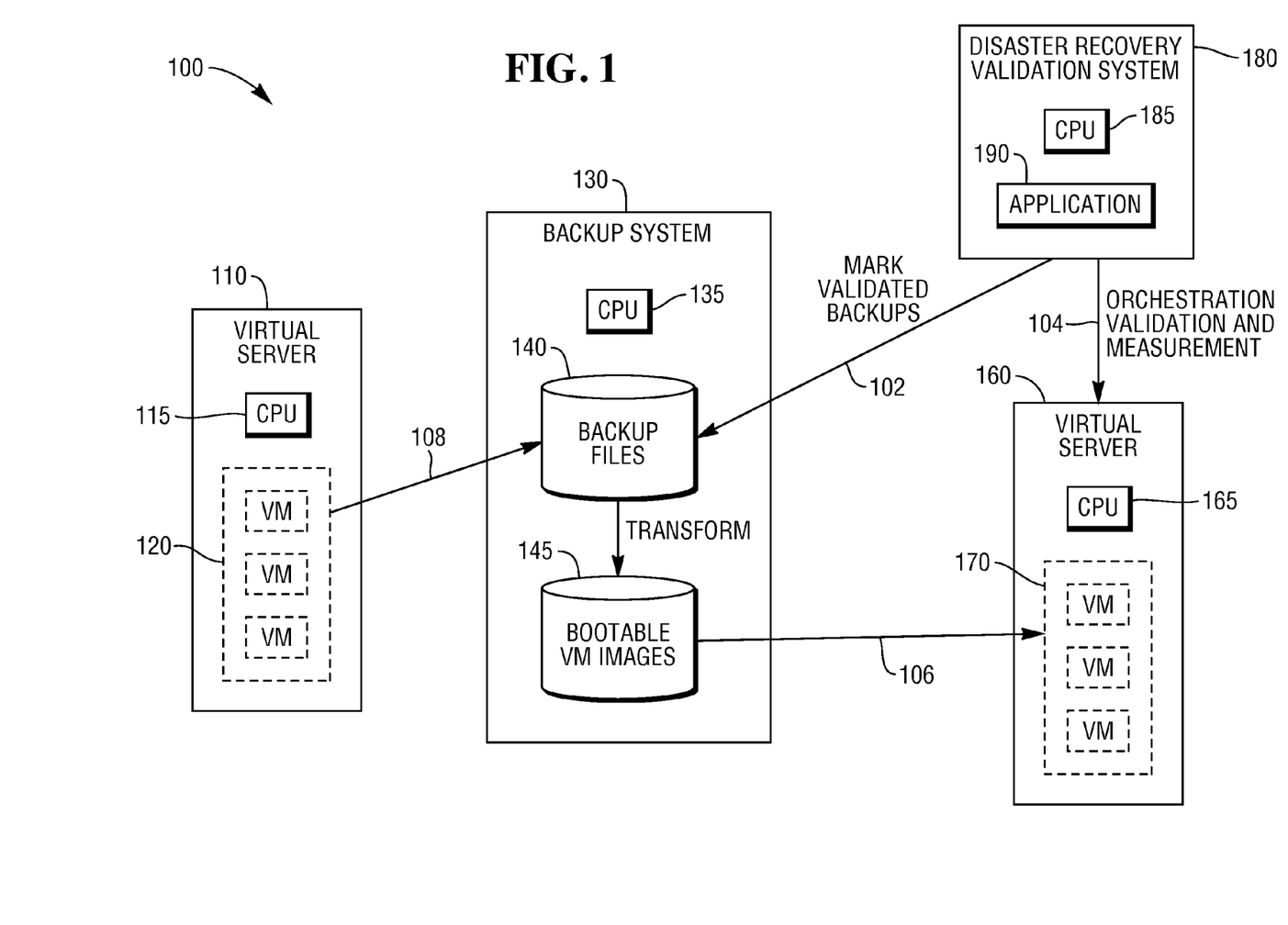
FIG. 1 is a high-level block diagram illustrating a disaster recovery system in accordance with an embodiment of the present invention.

With reference to FIG. 1, there is provided a high-level block diagram illustrating a disaster recovery system 100 in accordance with an embodiment of the present invention. The system 100 includes a first virtual server 110 and a second virtual server 160, a backup system 130 and a disaster recovery validation system 180. The first and second virtual servers 110, 160 are physical computer systems that implement one or more virtual machines 120, 170. Each virtual machine can load and execute an operating system and applications.

The backup system 130, also known as a backup appliance, is used to backup the virtual machines 120 of the first virtual server 110. To backup each of the virtual machines, a backup is created for each virtual machine. A backup, sometime referred to as a digital backup, includes all the information required to restore the operations of a virtual machine on another virtual machine. The backup system 130 receives copies of file data over a first communication path 108 from the first virtual server 110 for each virtual machine 120 and stores the file data in a 140 local storage. The backup system 130 then transforms the file data and stores it in a bootable VM image 145 associated with one of the virtual machines 120. The backup system 130 is described in more detail in a provisional U.S. patent application titled "DISASTER RECOVERY OF CONVERGED INFRASTRUCTURE PLATFORMS", Ser. No. 61/968,137, filed on Mar. 20, 2014 having the same assignee as this application and which is hereby incorporated by reference in its entirety into this application.

The backup system 130 is responsible for creating backups for virtual or physical machines and for restoring the backups to standby virtual or physical machines. The restoring function is performed when an operating virtual or physical machine fails or as a test to confirm that a backup can actually restore the operations of a virtual or physical machine. Part of testing a backup includes measuring restoration metrics to determine if the backup meets predetermined restoration values. The predetermined values include maximum time to restore the backup. The backup system 130 starts a computer restore process after receiving a restore command that specifies which backup to use and a virtual or physical machine where the backup is to be restored. The restore command may further include a script that is to be executed after the restore is complete. The script may be used to test the operation of the restored backup to confirm it is operating properly.

The second virtual server 160 includes a number of virtual machines (VM) 170 where at least one of the VMs 170 is used to test the restoration of a bootable VM image backup 145 and make measurements during the test. The second virtual server 160 communicates with the backup system 130 over a second communications path 106. Tests performed on the second virtual server 160 are controlled by application software 190 executing on the disaster recovery validation system 180. The application software 190 is stored in a local storage that is part of the disaster recovery validation system 180. The local storage is also used to stored data and information generated or used by the application software 190. The disaster recovery validation system 180 uses a third communications path 104 to communicate with the second virtual server 160. The disaster recovery validation system 180 uses a fourth communications path 102 to communicate with the backup system 130.

The disaster recovery validation system 180 includes a computer with a CPU 185 that executes the application software 190 which controls the features and functions of the disaster recovery validation system 180. Periodically, the application 190 determines it is time to test each of the bootable VM images 145 and measure a number of disaster recovery metrics associated with each of the bootable VM images 145. For each of the bootable VM images 145, there is a set of predetermined metric values that are compared against measured values to determine if a bootable VM image 145 meets requirements for a disaster recovery plan.

The disaster recovery metrics include the recovery time objective (RTO) and the recovery point objective (RPO). Once the actual disaster recovery metrics are measured and compared with the predetermined values, the results are sent to the backup system 130 to be stored as attributes of the associated bootable VM image 145. The backup system 130 may suitably send notifications when a bootable VM image 145 fails to meet the requirements of a disaster recovery plan.

Figure 2:
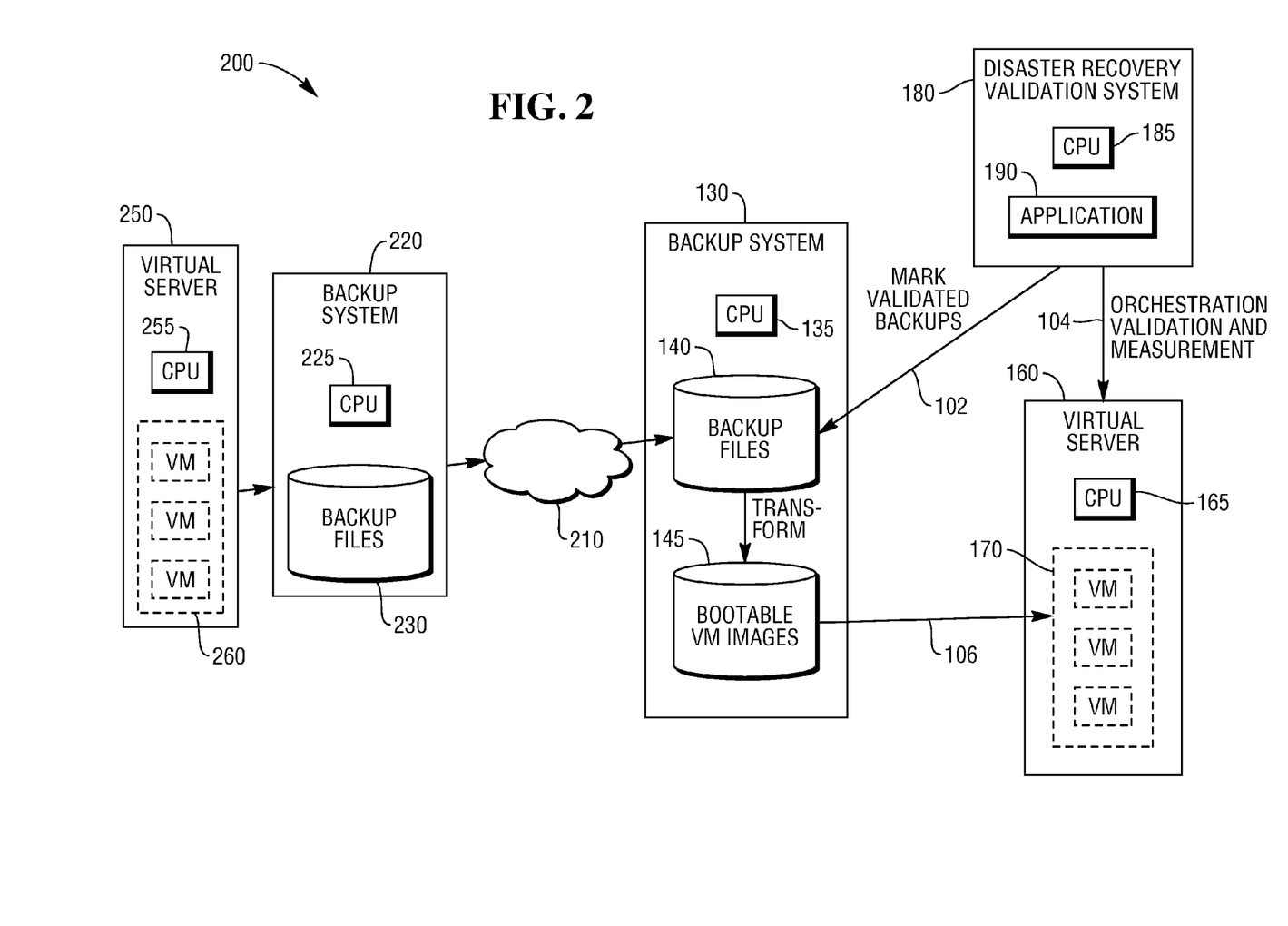
FIG. 2 is a high-level block diagram illustrating a disaster recovery system in accordance with an embodiment of the present invention where a wide area network is used to communicate with a backup system.

Turning now to FIG. 2, there is provided a high-level block diagram illustrating a disaster recovery system 200 in accordance with another embodiment of the present invention where a wide area network 210 is used to communicate with a remote backup system 220. The wide area network 210 is used to communicate with one or more remote backup systems that are located away from the main backup system 130. The wide area network 210 may suitably include a private network, a leased line network, the Internet or any combination thereof.

The remote backup system 220 includes a computer with a CPU 225 and local data storage to store backup files 230. The computer includes an operating system and application software that controls the features and functions of the remote backup system 220. The remote backup system 220 communicates with a virtual server 250. The virtual server 250 includes a computer that supports multiple virtual machines 260 which are backed up by the remote backup system 220. The remote backup system 220 sends files over the wide area network 210 to the main backup system 130 where the bootable VM images 145 are maintained that can be used to recover one or more virtual machines 260 on a virtual machine 170 of the virtual server 160.

Figure 3:
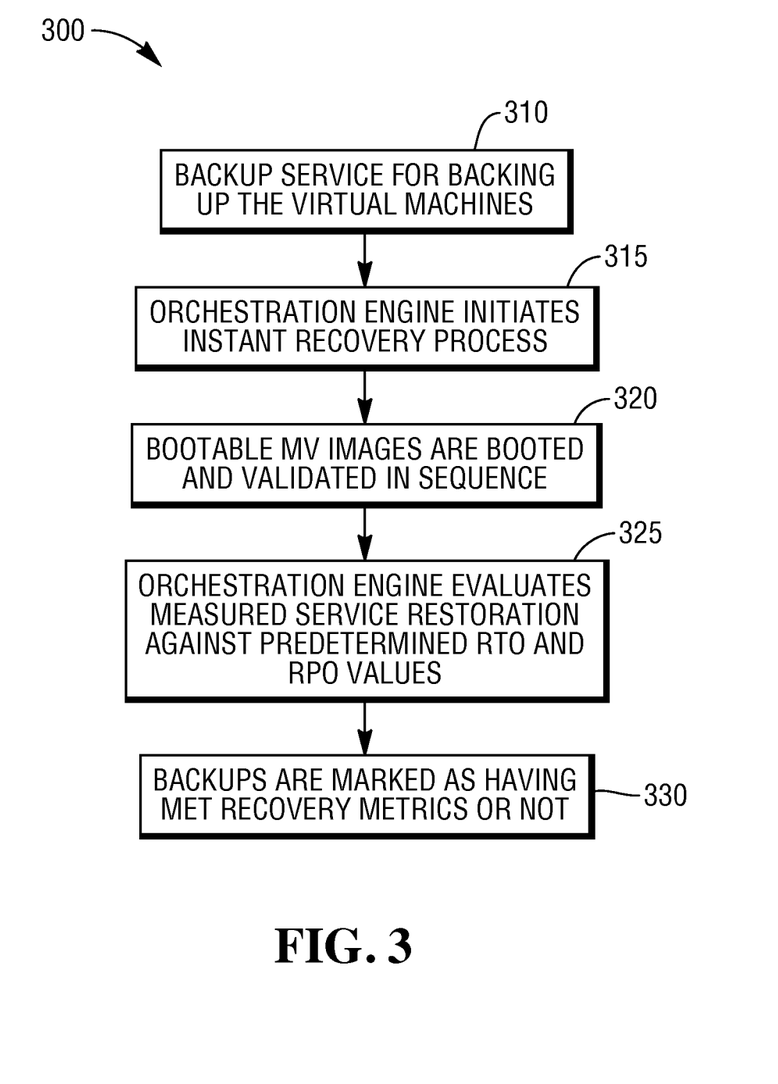
FIG. 3 is a high-level flowchart illustrating a method of operating an embodiment of the present invention.

FIG. 3 provides a high-level flowchart illustrating a method 300 of operating an embodiment of the present invention. At step 310, a backup service is continuously backing up the virtual machines 120, 260. The virtual machines may be local or remote or a combination thereof. The backup service creates a bootable VM image 145 for each virtual machine that is backed up.

At step 315, an orchestration engine 190 initiates the instant recovery process to test the bootable VM images 145. The orchestration engine 190 is the application 190 that controls the disaster recovery validation system 180. Periodically, the orchestration engine 190 will test each bootable VM image 145 to determine if it meets the requirements of a disaster recovery plan which includes predetermined metric values.

At step 320, during the periodic testing of each bootable VM image 145, the orchestration engine 190 starts one or more timers to measure the time it takes for certain events associated with the instant recovery process to occur. For example, the orchestration engine 190 will measure the time it takes to load and bring up a bootable VM image 145. As part of the testing, each bootable VM image 145 is loaded into a virtual machine 170, the virtual machine 170 is configured to execute the bootable VM image 145, and then the bootable VM image 145 is executed. Program execution continues until the data and services provided by the bootable VM image 145 are restored and available for use.

As described in step 325, execution is then halted, final system measurements are recorded, the virtual machine 170 is deleted and test results are produced. The recorded measurements are compared with predetermined values that are part of a disaster recovery plan to determine if each bootable VM image 145 meets plan requirements. In this embodiment, the disaster recovery plan includes the RTO and RPO metrics. The orchestration engine 190 determines the actual values for these metrics for each bootable VM image 145 and compares the actual values to the predetermined metric values stored in the plan. The comparison determines if a bootable VM image 145 has met the requirements in the disaster recovery plan.

In step 330, the results of the test are transmitted to the backup system 130 and stored as an attribute of the bootable VM image 145. The bootable VM image 145 is also marked as having met or not met the requirements of the disaster recovery plan. Each of the bootable VM images 145 are tested to determine if they meet the requirements of the disaster recovery plan.

Figure 4:
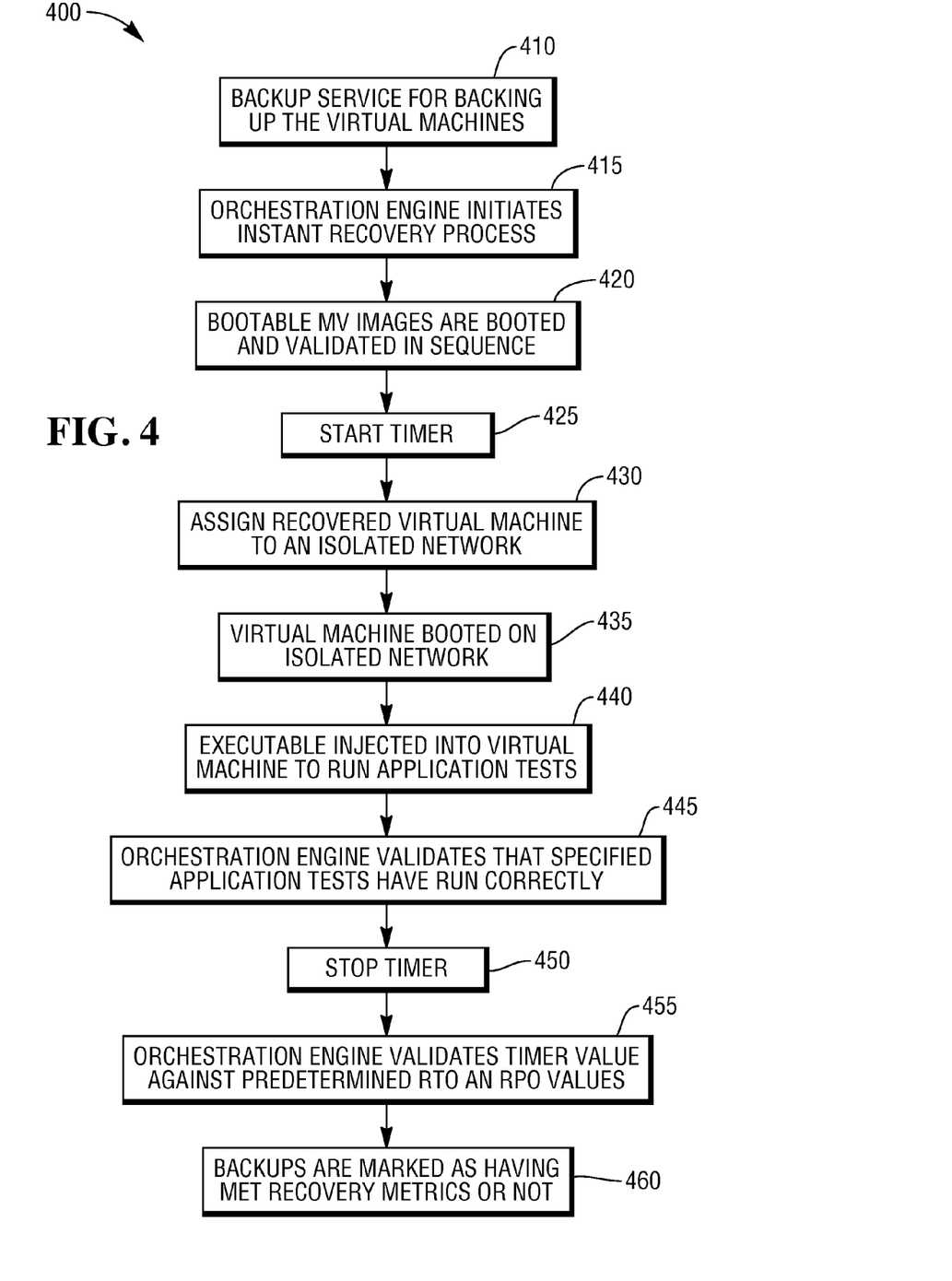
FIG. 4 is a high-level flowchart illustrating another method of operating an embodiment of the present invention.

FIG. 4 provides a high-level flowchart illustrating another method 400 of operating in accordance with an embodiment of the present invention. In this embodiment, one or more of the virtual machines 170 that are used to test the bootable VM images 145 are dynamically assigned to use an isolated network so that information generated by applications executing on the virtual machines 170 during the test can not escape onto a production network and cause problems. An isolated network is a network whose internet traffic can not escape on to a production or public network. Computers on an isolated network can use IP addresses that are used by computers on a production or public network without creating a conflict or other network issue. If a normal recovery was being made, the virtual machines 170 would be assigned to use a production network so the applications can access whatever network resources are required or provide whatever resources are needed.

At step 410, a backup service is continuously backing up the virtual machines 120, 260. The virtual machines may be local or remote or a combination thereof. The backup service creates a bootable VM image 145 for each virtual machine that is backed up.

At step 415, an orchestration engine 190 initiates the instant recovery process to test the bootable VM images 145. The orchestration engine 190 is the application 190 that controls the disaster recovery validation system 180. Periodically, the orchestration engine 190 will test each bootable VM image 145 to determine if it meets the requirements of a disaster recovery plan which includes predefined metric values.

At step 420, during the periodic testing of each bootable VM image 145, the orchestration engine 190 starts one or more timers to measure the time it takes for certain events associated with the instant recovery process to occur. For example, the orchestration engine 190 will measure the time it takes to load and bring up a bootable VM image 145. As part of the testing, each bootable VM image 145 is loaded into a virtual machine 170, the virtual machine 170 is configured to execute the bootable VM image 145, and then the bootable VM image 145 is executed. Program execution continues until the data and services provided by the bootable VM image 145 are: restored; available for use; and tested to assure they are operating properly.

In step 425, the orchestration engine 190 resets and then starts a timer to begin measurement to determine the recovery time for the recovered virtual machines. In some embodiments, multiple timers are used to time different aspects of the recovery process.

In step 430, the recovered virtual machine is assigned to an isolated network. This type of network is a network whose internet traffic does not escape onto a production or public network. This approach allows the recovered virtual machine to use the same IP addresses as the production virtual machines without causing any problems.

In step 435, the orchestration engine 190 issues a command to the virtual server 160 to boot one of the virtual machines 170.

In step 440, the orchestration engine 190 injects an executable script into the booted virtual machine 170. The script runs one or more tests specific to an application to determine if a feature or service is available for use. For example, the script may cause a database query to execute and then determine if the results are correct. In another example, the script may test a service such as an email server to determine if the service is available for use.

In step 445, the orchestration engine 190 validates that the outputs of the tests are correct to determine if the applications are functioning properly.

In step 450, the orchestration engine 190 stops the timer and uses a value read from the timer to determine the recovery time for the bootable VM image 145.

In step 455, the orchestration engine 190 halts execution of the virtual machines 170, records final system measurements, deletes the virtual machines 170 and produces test results. The recorded measurements are compared with predetermined values that are part of a disaster recovery plan to determine if each bootable VM image 145 meets plan requirements. In this embodiment, the disaster recovery plan includes the RTO and RPO metrics. The orchestration engine 190 determines the actual values for these metrics for each bootable VM image 145 and compares the actual values to the predetermined metric values stored in the plan. The comparison determines if a bootable VM image 145 has met the requirements in the disaster recovery plan.

In step 460, the results of the test are transmitted to the backup system 130 and stored as an attribute of the bootable VM image 145. The bootable VM image 145 is also marked as having met or not met the requirements of the disaster recovery plan. Each of the bootable VM images 145 are tested to determine if they meet the requirements of the disaster recovery plan.

Although the present invention has been described with particular reference to certain preferred embodiments thereof, variations and modifications of the present invention can be effected within the spirit and scope of the following claims.

What is claimed is:

1. A computer implemented method performed by a disaster recovery validation computer in communication with a backup appliance adapted to back up a computer, the method comprising:
   transmitting a restore command to the backup appliance wherein the restore command includes information that identifies a backup for the computer and a virtual machine and causes the backup appliance to restore the backup to the virtual machine where the backup is maintained by the backup appliance;
   receiving information from the backup appliance used to measure a time required to boot and bring up the backup on a virtual machine;
   comparing the measured time to boot and bring up the backup on the virtual machine to a predetermined recovery time objective to determine if the measured time meets the recovery time objective; and
   transmitting results of the comparison to the backup appliance to be stored as an attribute of the backup wherein the results include information identifying the backup.

2. The method of claim 1, wherein the computer being backed up is a converged infrastructure computer platform.

3. The method of claim 1 further comprising:
   comparing an age of the backup to a predetermined maximum backup age in the recovery time objective to determine if the age of the backup meets the recovery time objective,
   wherein the information received from the backup appliance includes the age of the backup.

4. The method of claim 3, wherein transmitting the results of the comparison includes transmitting the measured time to boot and bring up the backup on the virtual machine, the predetermined recovery time objective, and the results of the comparison.

5. The method of claim 4, wherein transmitting the results of the comparison further includes transmitting the age of the backup and the predetermined maximum backup age.

6. The method of claim 1, wherein the measured time required to boot and bring up the backup includes a time required for one or more applications in the backup to startup and be available to perform its predetermined function.

7. A computer implemented method performed by a disaster recovery validation system, the method comprising:
   retrieving information about a digital backup that is stored on a backup appliance wherein the stored digital backup is for a first converged infrastructure computer platform and is maintained by the backup appliance wherein the backup appliance is responsible for backing up and restoring the first converged infrastructure computer platform;
   transmitting a restore command to the backup appliance wherein the command includes information identifying the stored digital backup and causes the backup appliance to boot a second converged infrastructure computer platform from the identified stored digital backup and to execute applications stored in the identified stored digital backup;
   receiving, from the backup appliance, information used to measure a time required to boot the identified stored digital backup on the second converged infrastructure computer platform;
   comparing the measured time to boot the identified stored digital backup to a predetermined recovery time objective to determine if measured time meets the predetermined recovery time objective; and
   transmitting results of the comparison to the backup appliance to be stored as an attribute of the backup wherein the results include information identifying the backup.

8. The method of claim 7, wherein the second converged infrastructure computer platform is a virtual machine.

9. The method of claim 7, wherein retrieving information about a digital backup includes querying a database wherein the database includes information that identifies multiple digital backups and further includes predetermined recovery time objectives for each of the multiple digital backups.

10. The method of claim 7 further comprising:
    comparing an age of the identified backup to a predetermined recovery point maximum age objective to determine if the age of the identified backup is less than the recovery point maximum age objective.

11. The method of claim 10, wherein transmitting the results of the comparison includes transmitting results of comparing the age of the identified backup to a predetermined recovery point objective.

12. The method of claim 11 further comprising:
   storing the results of the comparison in a local storage on the disaster recovery validation system and associating the comparison with the identified stored digital backup.

13. The method of claim 7, wherein the identified stored digital backup includes an operating system and one or more applications needed to operate the first converged infrastructure.

14. The method of claim 13, wherein the identified stored digital backup further includes converged infrastructure configuration and mapping information for the first converged infrastructure computer platform where the converged infrastructure configuration and mapping information define a configuration of the first converged infrastructure computer system at a particular point in time.

15. The method of claim 7, wherein the backup appliance is remotely located from other components of the disaster recovery validation system.

16. The method of claim 7, further comprising:
   retrieving information about a second digital backup that is stored on the backup appliance wherein the second digital backup is for the first converged infrastructure computer platform and is maintained by the backup appliance wherein the backup appliance is responsible for backing UP and restoring the first converged infrastructure computer platform;
   transmitting a second restore command to the backup appliance wherein the second restore command includes information identifying the second digital backup and causes the backup appliance to boot a second converged infrastructure computer platform from the identified second digital backup and to execute applications stored in the identified second digital backup;
   receiving, from the backup appliance, information used to measure a second time required to boot the identified second digital backup on the second converged infrastructure computer platform;
   comparing the second measured time to boot the identified second digital backup to the predetermined recovery time objective to determine if the measured time meets the predetermined recovery time objective;
   transmitting second results of the comparison to the backup appliance to be stored as an attribute of the backup wherein the second results include information identifying the backup;
   generating a human readable report including transmitted results for the digital backup and the second digital backup; and
   transmitting the report to a supervisor computer for display to a supervisor.

17. A disaster recovery validation system comprising:
   a backup appliance operable to execute a first application that, when executed by the backup appliance, causes the backup appliance to:
   maintain a backup for a first converged infrastructure computer platform;
   receive backup attribute information associated with the backup for the first converged infrastructure computer platform; and
   associate the received backup attribute information with the first converged infrastructure computer platform; and
   a computer operable to communicate with the backup appliance and operable to execute a second application where the second application, when executed by the computer, causes the computer to:
   measure a time required to boot and bring up the backup on a second converged infrastructure computer platform;
   compare the measured time to boot and bring up the backup to a predetermined recovery time objective to determine if restoring the backup meets the recovery time objective; and
   transmit results of the comparison to the backup appliance to be stored as an attribute of the backup wherein the results include information identifying the backup.

18. A computer implemented method performed by a disaster recovery validation computer in communication with a backup appliance responsible for backing up a computer, the method comprising:
   isolating a virtual machine from production networks by assigning the virtual machine to an isolated network;
   determining a time required to boot and bring up a backup for the computer on the virtual machine where the backup is maintained by the backup appliance;
   comparing the time to boot and bring up the backup to a predetermined recovery time objective to determine if the backup meets the recovery time objective; and
   transmitting results of the comparison to the backup appliance to be stored as an attribute of the backup.

19. The method of claim 18 further comprising:
   injecting a script into the virtual machine wherein the script tests one or more functions of restored applications.

* * * * *